United States Patent
Bar-Ness et al.

(10) Patent No.: US 12,416,992 B2
(45) Date of Patent: Sep. 16, 2025

(54) STYLUS SPEED

(71) Applicant: Microsoft Technology Licensing, LLC, Redmond, WA (US)

(72) Inventors: Assaf Bar-Ness, Redmond, WA (US); Shoham Dekel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/608,848

(22) Filed: Mar. 18, 2024

(65) Prior Publication Data

US 2024/0281085 A1 Aug. 22, 2024

Related U.S. Application Data

(63) Continuation of application No. 17/760,764, filed as application No. PCT/US2020/049296 on Sep. 4, 2020, now Pat. No. 11,966,533.

(30) Foreign Application Priority Data

Sep. 16, 2019 (EP) ..................... 19197601

(51) Int. Cl.
  *G06F 3/041* (2006.01)
  *G06F 3/01* (2006.01)
  (Continued)

(52) U.S. Cl.
  CPC .......... *G06F 3/04162* (2019.05); *G06F 3/016* (2013.01); *G06F 3/03545* (2013.01);
  (Continued)

(58) Field of Classification Search
  CPC .. G06F 3/04162; G06F 3/016; G06F 3/03545; G06F 3/046; G06F 3/0441; G06F 3/0446; H01Q 21/061
  See application file for complete search history.

(56) References Cited

U.S. PATENT DOCUMENTS

2013/0285966 A1 10/2013 Kimura
2015/0103039 A1 4/2015 Cho
(Continued)

FOREIGN PATENT DOCUMENTS

CN 107567038 A 1/2018
CN 108139820 A 6/2018

OTHER PUBLICATIONS

Second Office Action Received for Chinese Application No. 202080065144.9, mailed on Sep. 6, 2024, 06 pages. (English Translation Provided).
(Continued)

*Primary Examiner* — Patrick N Edouard
*Assistant Examiner* — Joseph P Fox
(74) *Attorney, Agent, or Firm* — Barta Jones, PLLC

(57) ABSTRACT

A device for use with a touch surface digitizer, the device comprising: a sensor configured to receive uplink signals emitted by a grid of antennas in the digitizer, and a controller configured to detect the uplink signals via the sensor; wherein the controller is further configured to determine a speed of the device based on a detected sequence of the uplink signals as received at the sensor from one or more junctions of the antenna grid relative to a predetermined spatial pattern of the uplink signals as emitted across the grid.

20 Claims, 4 Drawing Sheets

(51) Int. Cl.
   *G06F 3/0354*    (2013.01)
   *G06F 3/044*     (2006.01)
   *H01Q 21/06*     (2006.01)

(52) U.S. Cl.
   CPC ......... *G06F 3/0441* (2019.05); *H01Q 21/061* (2013.01); *G06F 3/0446* (2019.05)

(56) References Cited

U.S. PATENT DOCUMENTS

| | | |
|---|---|---|
| 2015/0193033 A1 | 7/2015 | Westhues |
| 2017/0364167 A1 | 12/2017 | Ribeiro et al. |
| 2018/0113519 A1* | 4/2018 | Yamamoto .......... G06F 3/04166 |
| 2020/0073530 A1* | 3/2020 | Kim ................... G06F 3/04166 |

OTHER PUBLICATIONS

Office Action Received for Chinese Application No. 202080065144.9, mailed on May 31, 2024, 15 pages.
Office Action Received for Indian Application No. 202247007456, mailed on Aug. 8, 2024, 7 pages.
Communication under Rule 71(3) EPC for EP Application No. 19197601.8, mailed on Oct. 29, 2021, 7 Pages.
Decision to grant a European patent pursuant to Article 97(1) EPC for EP Application No. 19197601.8, mailed on Jan. 13, 2022, 2 Pages.
Notice of Allowance Received for Chinese Application No. 202080065144.9, mailed on Jan. 28, 2024, 5 pages. (English Translation Provided).

* cited by examiner

| Combination | Stylus Signal |
|---|---|
| (0,0) | Strong '0' ping - 0 |
| (0,1) | Nothing - X |
| (1,0) | Nothing - X |
| (1,1) | Strong '1' ping - 1 |

STYLUS SPEED

CROSS-REFERENCE TO RELATED APPLICATION

This application is a continuation application of and claims priority to U.S. patent application Ser. No. 17/760,764, entitled "STYLUS SPEED," filed on Mar. 16, 2022, which is a 371 of PCT Application No. PCT/US2020/049296, entitled "STYLUS SPEED," filed on Sep. 4, 2020, which claims priority to EP Application No. 19197601.8, filed on Sep. 16, 2019, the disclosures of which are incorporated herein by reference in their entireties.

TECHNICAL FIELD

The present invention relates to determining the movement of a device such as a stylus on a digitizer.

BACKGROUND

Many touch-sensitive computing devices employ an active stylus to enhance touch interaction. Determining the position of the stylus and enabling other functionality in such systems may be provided via electrostatic communication, i.e., between the stylus and the touch sensor of the host computing device. The host computing device and its various components (display, capacitive touch sensor, etc.) will at times be collectively referred to herein as a "digitizer." The stylus emits a signal which is detected by a grid of antennas in the digitizer in order to detect the position of the stylus.

SUMMARY

Determining the speed of a stylus as it moves across a digitizer can be useful for some applications. For example, the speed can be used to determine the kind of pen stroke the user is making, or the level of haptic feedback to provide to the user. One way to do this is to detect the speed at the digitizer by detecting the change in the detected position of the stylus in the normal manner. However, if the speed reading is needed at the stylus, such as to give haptic feedback, then this method is relatively slow since the speed information has to be transmitted back to the stylus. A known method for estimating the speed at the stylus itself is to use an accelerometer onboard the stylus. However, this is quite inaccurate. Similar issues could also affect other devices for writing or indicating a position on a digitizer.

According to a first aspect of the present disclosure there is provided a device for use with a touch surface digitizer, the device comprising: a sensor configured to receive uplink signals emitted by a grid of antennas in the digitizer; and a controller configured to detect the uplink signals via the sensor; wherein the controller is further configured to determine a speed of the device based on a detected sequence of the uplink signals as received at the sensor from one or more junctions of the antenna grid relative to a predetermined spatial pattern of the uplink signals as emitted across the grid.

Thus the calculated speed of the device (e.g. stylus) is provided at the device itself quickly for use in a desired application function implemented at the device (as opposed to the digitizer unit), and with an accuracy which is not achievable using pre-existing stylus based techniques.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
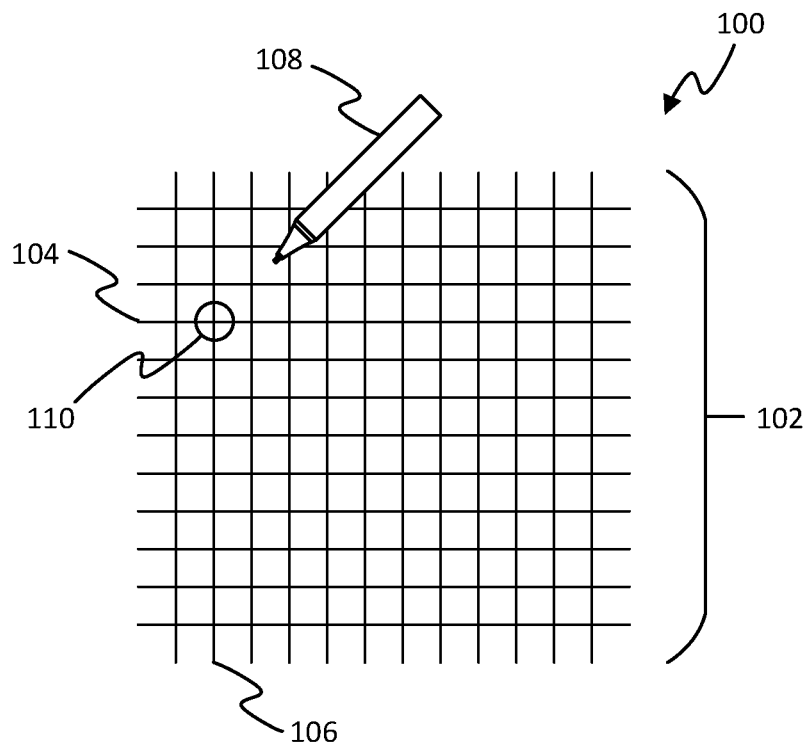
FIG. 1 shows a typical digitizer and stylus system.

Determining the speed of a stylus as it moves across a digitizer can be useful for some applications. For example, the speed can be used to determine the kind of pen stroke the user is making. This is in addition to other information such as tip pressure and the angle of the stylus to the surface it's writing on (the plane of the digitizer). Typically this speed information is determined by the digitizer. This is because the digitizer is already determining the position of the stylus at any one time, and therefore the additional determination of the speed of the stylus is relatively straightforward. However, if the stylus itself is required to implement an application function using the speed information, then the speed information determined by the digitizer must at some point be transmitted to the stylus by the digitizer.

Typically the process of transmitting speed information to the stylus from the digitizer takes a certain amount of time. Thus by the time the stylus can act on this speed information, the actual speed of the stylus may have changed. This introduces a certain amount of lag between the actual speed of the stylus as dictated by the user, and the speed information being responded to by the stylus application. This delay may be noticed by the user of the stylus. For example, if the speed is used to provide certain types sensory feedback, the user will notice the sensory feedback changing at a different time than their own movements of the stylus. Even the tiniest differences may be picked up by some users. This delay can diminish a user's experience of the stylus as such discrepancies may become annoying or distracting. For example, such an application is providing haptic feedback. The haptic motor strength may be proportional to the stylus' speed. Another example may be a light on the stylus configured to flash or change color corresponding to the speed of the stylus.

The inventors have realized that to eliminate the delay in communicating the stylus speed to the stylus itself, it is necessary to determine the speed at the stylus. Existing hardware for implementing such a configuration typically involves the use of an accelerometer in the stylus, which can measure the proper acceleration of the stylus from the forces exerted on the accelerometer as the stylus moves, as thus determine the stylus' change in speed over time. Accordingly, the speed measured by the accelerometer is relatively inaccurate over the smaller distances involved, e.g. pen strokes while writing, and is too noisy to determine accurate speeds of the stylus. This is because the speed is determined by integrating the acceleration. However, as there are still some unknowns the integration can only be so accurate. This inaccuracy can be referred to as noise, and the determined speed therefore is also referred to as noisy.

It has been recognized that there is a need for a way to determine the speed of a device at the device and which provides a measured speed with little to no noise.

The present application describes a device (e.g. a stylus), a digitizer, and a method for determining the device' speed.

It should be appreciated that the input device (i.e. the pointing or indicator device) need not be limited to a stylus. Other devices for use with a digitizer may also have their speed determined in the herein described way. For example, the input device may be a glove, a ring, a sleeve, or a cap, etc. All of these examples may also be configured to provide haptic feedback in response to determining the speed of the movement of the input device on a digitizer. Embodiments herein will be described by way of example in relation to a stylus, but it will be appreciated that this is not necessarily limiting and more generally any of the techniques disclosed herein could also apply to any kind of indicator device for writing, pointing or otherwise indicating a position on a digitizer.

The present document describes how to add dedicated circuitry connected to the digitizer antennas so that each transmits a ping signal within the digitizer transmission cycle. As the stylus moves across the digitizer it receives the ping signal from a plurality of the antenna as an uplink signal. The uplink signal is different depending on the stylus' position on the digitizer. That is to say the uplink signal varies spatially over the digitizer in a predetermined pattern. The stylus itself can determine its movements across the digitizer over a number of digitizer transmission cycles based on a sequence of received uplink signals, and thus determine its speed accordingly. The ping signal is separate and different from any other signal, e.g. a data signal, transmitted from the digitizer to the stylus.

That is, a stylus can comprise a sensor tip for receiving uplink signals from a grid of antennas in a digitizer. The uplink signals received via the sensor tip are detected by a controller of the stylus which, based on a detected sequence of uplink signals from the junctions of the antenna grid, and how that sequence relates to a predetermined and predefined spatial pattern of uplink signals emitted by the grid, can be used to determine the speed of the stylus.

In embodiments, a digitizer for use with said stylus may comprise a grid of crisscrossing antennas which emit an uplink signal from each junction. In this case, the uplink signal may comprise two interfering ping and/or inverse ping signals. A signal generator module in the digitiser can be used to for generating the ping signal. Electronic circuitry of the digitizer, arranged to connect each antenna in the grid to the signal generator to provide the multiple uplink signals, allows the uplink signal as detected by the stylus to be different at any two neighbouring junctions of the grid.

The stylus and digitizer can be used together to determine the speed of the stylus on the digitizer (e.g. touch screen). This is achieved by transmitting an uplink signal during each digitizer transmission cycle from a plurality of junctions of a grid of antennas in the digitizer. The uplink signal is then detected by the stylus over at least two digitizer transmission cycles from one or more junctions of the grid of antenna. Based on a sequence of the detected uplink signals received at the stylus, the stylus can then determine a speed of the stylus. The digitizer may for example be the digitizer of a touch screen or other such touch surface.

FIG. 1 shows a typical digitizer and stylus system 100. The digitizer 102 comprises a plurality of row antenna 104 and column antenna 106. Where each of the row antenna 104 crosses a column antenna (or vice versa) there is a junction 110. These junctions are typically used for determining the position of the stylus using electrostatic forces. As the stylus 108 moves across the digitizer it interacts with the junctions and allows the digitizer to determine certain information such as stylus position. Data can also be transmitted between the stylus 108 and the digitizer 102.

Figure 2:
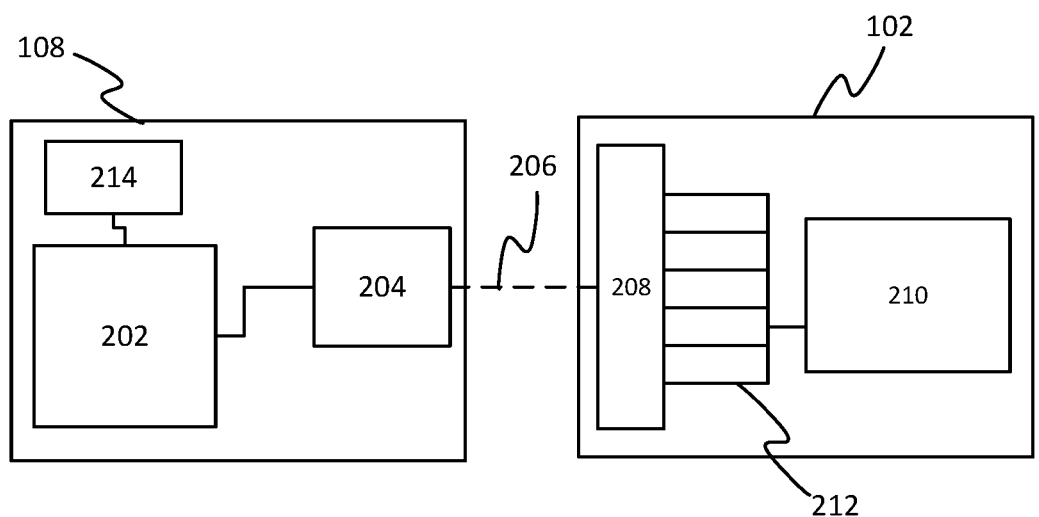
FIG. 2 shows a schematic block diagram of a stylus and digitizer system.

FIG. 2 shows a schematic block diagram of the stylus and digitizer system 100 of FIG. 1. The stylus 108 comprises a controller 202 and a sensor tip 204. The controller is connected to the sensor tip 204, and the sensor tip 204 acts as a transmitter and receiver for communicating with the digitizer 108, including the uplink signal 206. The controller 202 determines what data is transmitted to and from the digitizer 102 and is responsible for performing actions in response to the uplink signal 206 emitted by the digitizer 102.

The digitizer 102 comprises a grid of antennas 208 (e.g. comprising rows 104 and columns 106), a ping signal generator 210, and dedicated circuitry 212 for connecting the ping signal generator 210 to the grid of antennas 208. The ping signal transmitted by the antennas can be detected by the stylus tip 204 as an uplink signal 206.

The stylus may also comprise local storage 214. This may be used to store information about the digitizer the stylus is being used with, for example a spatial pattern of uplink signals (described in more detail below), or a plurality of uplink sequences (described in more detail below).

Figure 3:
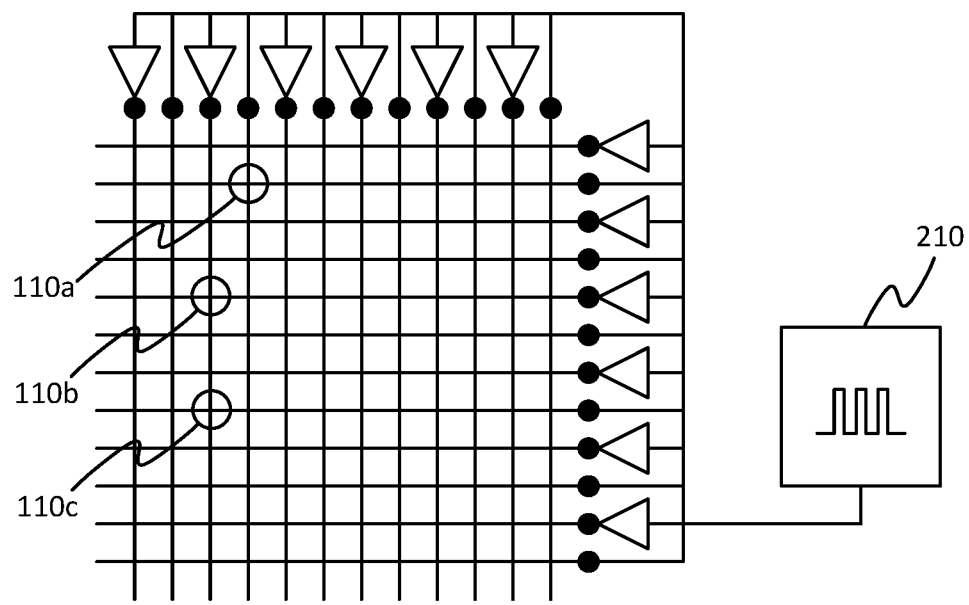
FIG. 3 shows an example implementation of a digitizer with an antenna grid.

FIG. 3 shows an example implementation of the digitizer 102, with the antenna grid 208 comprising row antenna 104 and column antenna 106 as in FIG. 1. FIG. 3 further comprises specific dedicated circuitry 212. The dedicated circuitry 212 comprises circuitry for providing the ping signal to each of the antenna in the grid 208. Alternate row antenna 104 and alternate column antenna 106 are also provided with a NOT gate or signal inverter. The NOT gate inverts the ping signal before reaching the antenna. Thus, alternate row antennas 104 and alternate column antennas 106 are provided with an inverted ping signal opposed to the ping signal as generated.

The ping signal generator 210 supplies the dedicated circuitry 212 with the generated ping signal. As the signal passes into each of the antenna it either does or does not pass through a NOT gate. For those antennas with NOT gates the ping signal is inverted. As a result of the antenna overlapping at the junctions the ping signals also overlap at the junctions, causing the ping signals to interfere with each other. As a result of alternate antenna outputting inverted and not inverted ping signals this interference is present as a predetermined signal pattern across the surface of the digitizer. This signal at any one point or junction 110 of the grid 208 (or the immediate vicinity thereof) is the uplink signal 206 detected by the sensor tip 204 of the stylus 108.

For example, at junction 110a the specific column antenna does not have a NOT gate, therefore that antenna is outputting the normal ping signal as generated. The specific row antenna also does not have a NOT gate, therefore that antenna is also outputting the normal ping signal. The interference between the two output 'normal' (non-inverted) ping signals at the junction 110*a* is therefore constructive interference, where the two identical ping signals reinforce each other. The resulting uplink signal (the combined ping signals after they have interfered with each other) is therefore the 'normal' ping signal with a higher amplitude, or a strong signal strength. The 'normal' ping signal can be more simply thought of as a '1' bit signal. Therefore junction 110*a* provides a strong '1' signal.

At junction 110*b* the specific column antenna does have a NOT gate, therefore that antenna is outputting the inverted ping signal. The specific row antenna also has a NOT gate, therefore that antenna is also outputting the inverted ping signal. The interference between the two output inverted ping signals at the junction 110*b* is therefore constructive interference, where the two identical ping signals reinforce each other. The resulting uplink signal (the combined ping signals after they have interfered with each other) is therefore the inverted ping signal with a higher amplitude, or a strong signal strength. The inverted ping signal can be more simply thought of as a '0' bit signal, and the opposite of the '1' signal. Therefore junction 110*b* provides a strong '0' signal.

At junction 110*c* the specific column antenna does have a NOT gate, therefore that antenna is outputting the inverted ping signal. The specific row antenna does not have a NOT gate, therefore that antenna is outputting the 'normal' (non-inverted) ping signal. The interference between the output inverted ping signal and the output 'normal' ping signal at the junction 110*c* is therefore destructive interference, where the two different and opposite ping signals cancel each other out. The resulting uplink signal (the combined ping signals after they have interfered with each other) is therefore no signal. The two signals have cancelled each other out so that no uplink signal is detected and therefore junction 110*c* provides no signal, which can be denoted by an 'X'.

It should be understood that there are multiple ways of arranging the circuitry 212 in order to provide such an arrangement of alternating normal and inverted ping signals to the antennas of the grid 208, of which the arrangement shown in FIG. 3 is just one example. Another example may be to arrange the dedicated circuitry such that two parallel sub-circuits, one for the inverted ping signal and one for the 'normal' ping signal, may connect the ping signal generator 210 to alternate antenna which are connected together. Thus only a single NOT gate would be required in one of the sub-circuits in order to provide all of that one group of antennas with the inverted ping signal.

Figure 4:
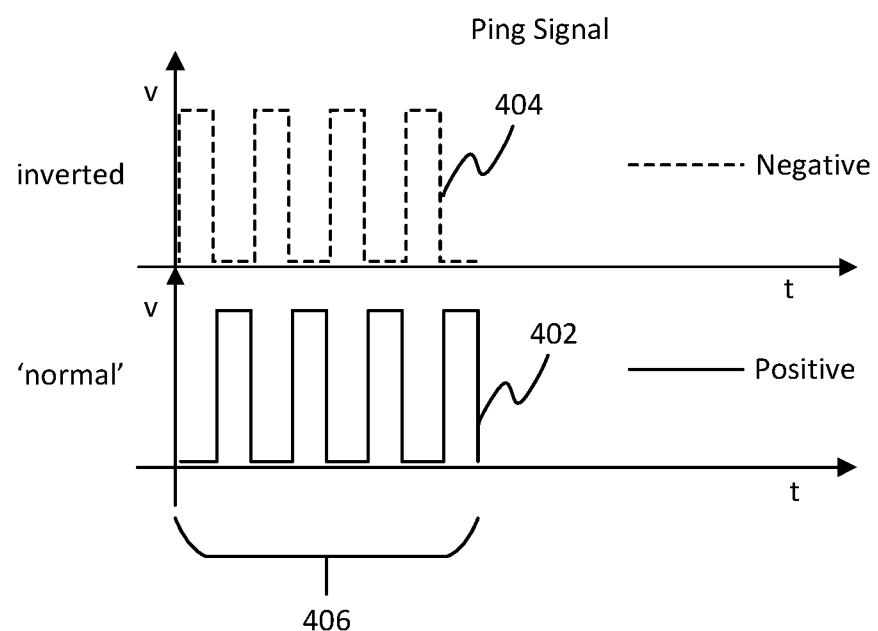
FIG. 4 is a timing diagram of two example ping signals, a non-inverted ping signal below an inverted ping signal.

FIG. 4 shows two example ping signals, one 'normal' and one inverted (a normal ping signal having passed through a NOT gate). The bottom signal 402 represents the 'normal' ping signal or '1' signal, and can be referred to as a positive signal. The top signal 404 represents the inverted ping signal (obtained by inverting the 'normal' ping signal) or '0' signal, and can be referred to as a negative signal. It can be seen that by inverting the 'normal' ping signal the peaks have become troughs and the toughs have become peaks, providing what is considered as the opposite signal. It is easy to see from this representation how, given one 'normal' ping signal and one inverted ping signal, the two signals may overlap or combine to cancel each other out.

The total period of the ping signal 406 is short when compared to the total length of the digitizer transmission cycle. This is because a more complicated signal is not necessary. The signal only needs to be able to be detected as present or not present in normal and inverted forms. This helps to make the detection process as fast as possible and thus helps to reduce the delay in determining the speed of the stylus later in the process.

Figures 5, 6:
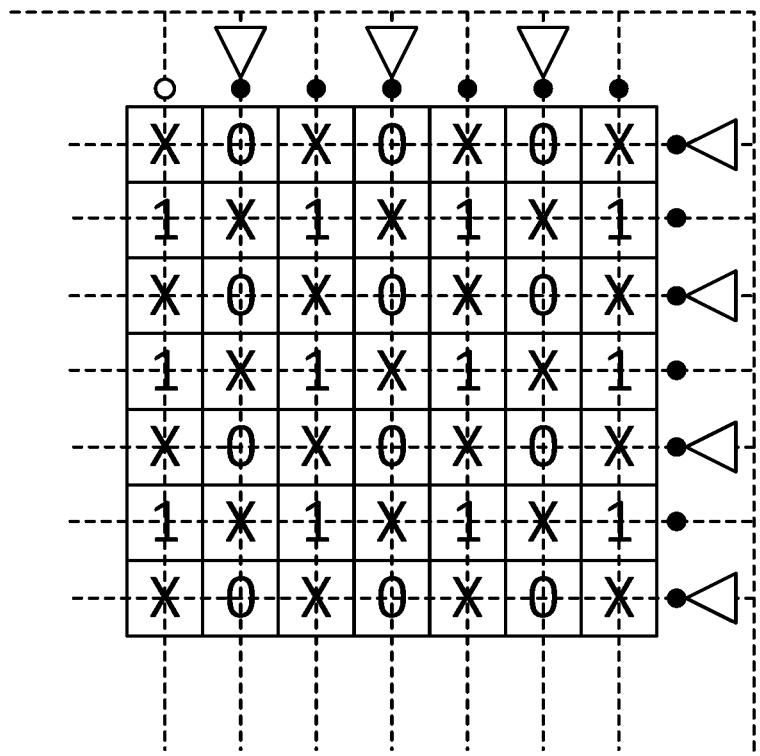
FIG. 5 shows an example of a spatially distributed pattern of uplink signals which varies across the antenna grid of a digitizer.
FIG. 6 is a table showing how the combinations of non-inverted ping signals and inverted ping signals combine to create the uplink signal as detected by the stylus.

FIG. 5 shows an example of a spatially distributed pattern of uplink signals 206 as they vary across the antenna grid 208. The pattern in FIG. 5 relates specifically to the implementation described hereinabove in relation to FIGS. 3 and 4. The antenna grid 208 is shown as dashed lines in the background. On top of the antenna grid 208 are boxes, each box representing a different junction of the grid 208 and the area around that junction. When the stylus tip is within any one of these boxes a different uplink signal is detected. The specific uplink signal detected is represented inside each of the boxes using the previously described '1', '0', and 'X' characters. It can be seen that no two adjacent boxes contain the same character, and thus the corresponding uplink signal detected by the stylus tip 204 differs in the same way. This spatial pattern allows the movement of the stylus to be determined by the stylus based on the received uplink signal.

FIG. 6 shows in a table how the combinations of 'normal' ping signals—'1', and inverted ping signals—'0', can combine to create the uplink signal 206 as detected by the stylus 108. The uplink signal is detected once every transmission cycle of the digitizer. That is to say, every time the digitizer goes through its transmission cycle once, the pings signals are emitted from the antenna of the grid 208, the uplink signals are emitted from the digitizer, and the stylus detects the uplink signal of the portion of the grid 208 it is closest to.

Figure 7:
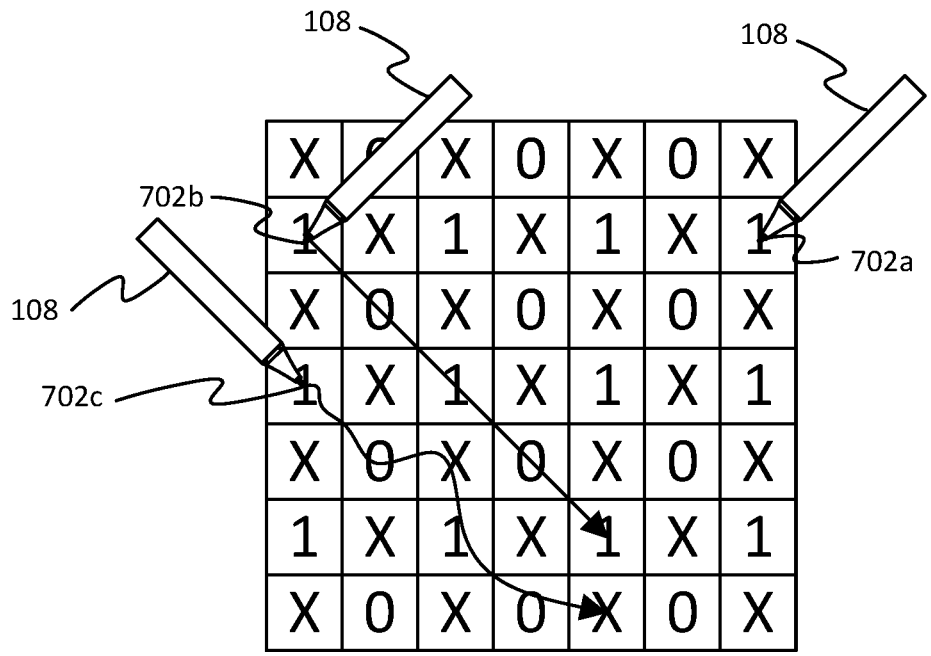
FIG. 7 shows three example trajectories of the stylus on the digitizer.

FIG. 7 shows three example trajectories 702 of the stylus 108 on the digitizer 102. The first trajectory 702*a* is the result of the stylus 108 not moving on the digitizer 102. As a result the series of uplink signals received by the stylus is 1, 1, 1, 1. As each uplink signal is received in a single, periodic, digitizer transmission cycle, the stylus can use this information to determine its speed. Because the uplink signal does not change throughout the sequence, the stylus knows that it did not move. And because the digitizer's transmission cycle is periodic, and therefore the time between uplink signals is a known and constant time, the stylus also knows how long it was stationary.

The second trajectory 702*b* is the result of the stylus moving in a straight diagonal line on the surface of the digitizer 102. This results in the sequence of uplink signals received by the stylus being 1, 0, 1, 0, 1. From this the stylus knows it has moved directly from a positive signal to a negative signal, which corresponds to a distance diagonally between junctions of the grid 208. The stylus knows it has moved this distance four times in the time of four digitizer cycles, and therefore knows the time it took to move this distance. As the stylus can determine the distance it moved and time in which it moved that distance the stylus can determine its speed. Such a calculation can be made as the stylus goes across the board from uplink signal measurement to uplink signal measurement. This results in a fast and accurate determination of the speed of the stylus at the stylus. There is no transmission of speed information from one entity to the other unlike in other methods. The accuracy of the calculated speed of the stylus depends only on the length of the digitizer transmission cycle and the spacing between the junctions of the digitizer. The stylus need only know the uplink signal change from one or more previous uplink signals, what the grid spacing is in corresponding directions to those changes, and the time interval between the uplink signals.

The third trajectory 702c is the result of a somewhat random movement across the grid of antennas 208. The resulting sequence of uplink signals detected by the stylus 108 would be 1, 0, X, 1, 0, X. The only way a '1' can become a '0' is by the stylus moving diagonally from one junction to the next. The only way a '0' can become an 'X' is by the stylus moving parallel to an antenna from one junction to the next. Similarly the only way an 'X' can become a zero is by the stylus moving parallel to an antenna from one junction to the next. Thus as explained above, the stylus can calculate its speed directly from the detected uplink signal sequence by knowing information about the uplink signal spatial pattern on the digitizer and the timing between uplink signal transmissions.

That is to say, calculating the speed of the stylus can be done by deriving a distance moved by the stylus and a time over which that distance was moved. This can be based on the duration of instances of different uplink signals being received from different junctions of the antenna grid and the known distance between the junctions transmitting those different uplink signals.

It should be appreciated that the speed as determined in this way has an upper limit, where if the stylus moves across more than one junction between uplink signals then an uplink signal character in the sequence will be missed, and the speed will be calculated incorrectly. However, by correctly balancing the distance between the junctions and the timing between the uplink signal transmissions, it is possible to calculate the speed of a stylus when performing typical motions on the digitizer (e.g. writing, drawing, playing a game, etc.) both quickly and accurately.

Figure 8:
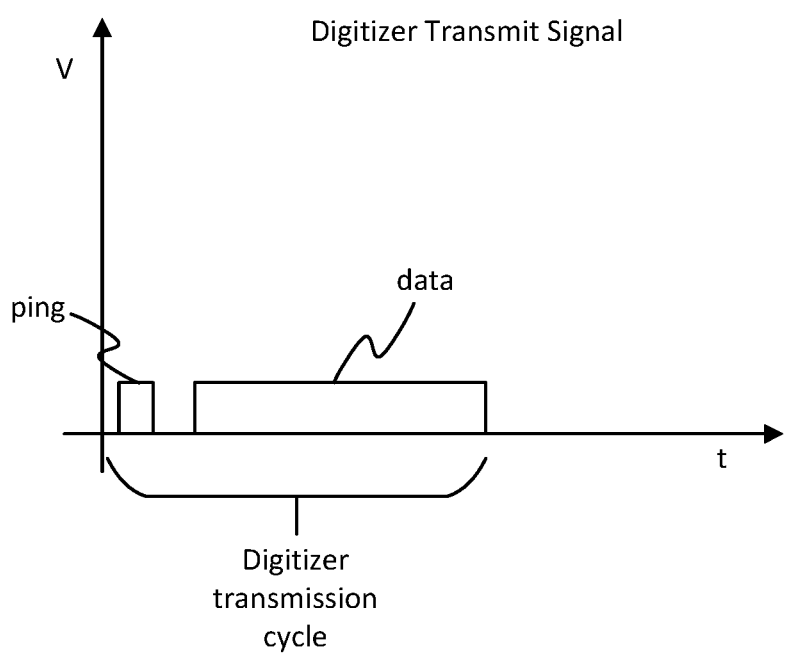
FIG. 8 shows a ping signal and a data signal within a digitizer transmission cycle.

FIG. 8 shows a ping signal and a data signal within a digitizer transmission cycle. In each cycle there is one ping signal (as output by a single antenna), and there may also be a data signal. The data signal may include data such as encryption keys for dedicated Bluetooth channels, or digitizer status, etc. The ping signal is shown in FIG. 8 at the beginning of the transmission cycle, however it may just as easily be placed at the end of the transmission cycle, e.g. after any data. So long as the ping signal is transmitted at regular time intervals, i.e. once per transmission cycle, the position within the digitizer's transmission cycle is not important.

The following are numerical examples of speeds of the stylus with the above example trajectories and an example configuration of a digitizer.

For example, the digitizer may have an antenna spacing, between parallel antenna in the both the rows and columns, of 4 millimeters. This is also sometimes referred to as the antenna pitch. The transmission cycle of the digitizer may have a duration of 15 milliseconds, with a ping signal duration of 31 microseconds. The ping signal may be provided by dedicated circuitry which is synchronized with the digitizer cycle. Thus the ping signal is part of the digitizer transmission cycle or window. Since the uplink signal (the combined ping signals) is observed as part of the transmission window, the stylus will receive it and measure it. Thus, based on the uplink signal measurement (every 15 ms), the stylus can evaluate its speed compared to the digitizer.

For the first example trajectory 702a the detected sequence is 1, 1, 1, 1, 1. It is straightforward from this sequence to determine that the stylus has not moved between the received uplink signals. Therefore the speed of the stylus is determined to be zero.

In the second example trajectory 702b the detected sequence of uplink signals is 1, 0, 1, 0, 1. It can be determined from knowledge of the spatial pattern of the uplink signals of the digitizer, for example as stored in the local storage of the stylus, that the stylus has moved diagonally across the digitizer. Based on the known antenna pitch the uplink signal sequence can be determined to correspond to a specific distance. In this example there are five uplink signals received, one every 15 milliseconds. Therefore by dividing the determined distance by the time it took to receive the uplink signal sequence in question, the speed of the pen can be determined. For this second example trajectory 702b the speed of the stylus is determined to be approximately 0.38 meters per second (m/s). This comprises four diagonal distances across the digitizer (each approximately 5.66 mm), divided by the time it takes to transmit five uplink signals (4×15 ms).

For the third example trajectory the detected uplink signal sequence is 1, 0, X, 1, 0, X. This trajectory can be seen to be more random. As seen based solely on the sequence the distance corresponds to a combination of diagonals movements between junctions and adjacent moves between junctions. For example, this distance consists of a maximum distance comprising one diagonal movement (approximately 5.66 mm), followed by two adjacent movements (4 mm plus 4 mm), followed by one diagonal movement (5.66 mm), and one final adjacent movement (4 mm). This distance divided by the time it takes to transmit six uplink signals (5×15 ms) gives the stylus a speed of approximately 0.31 m/s.

If the antennas' pitch is 4 mm, the stylus can measure maximum velocity of about 0.38 m/s. This corresponds to the straightest line along the longest dimension between digitizer junctions, e.g. trajectory 702b.

In another example the detected uplink signal may be 1, 1, 0, 0, X, X, 1, 1, . . . etc. This corresponds to the stylus travelling along the same trajectory as example 702c, but at half the speed. It can be seen from FIG. 7 how the stylus would spend twice as long in the vicinity of each junction such that the uplink signal from each particular junction would be received twice. A calculation as in the examples above would provide a speed measurement of proximately 0.15 m/s for this detected uplink signal sequence.

In embodiments, the stylus may not calculate the speed directly based on the detected uplink sequence and knowledge of the spatial pattern of uplink signals on the digitizer, but may simply match the sequence to one of a plurality of predetermined sequences stored locally at the stylus. The predetermined sequences corresponding to a predetermined speed of the stylus. This is possible when the spatial pattern of uplink signals at the digitizer is known in advance, and thus speeds for possible sequences of uplink signals can be calculated in advance.

It will be appreciated that the above scheme has been described only by way of example. More generally, any predetermined spatial pattern of uplink signals could be used across the surface of the digitizer, as long as the controller 202 of the stylus is programmed with information on what corresponding sequence of uplink signals to expect for one or more possible paths of the stylus across the digitizer.

In embodiments, a more complicated uplink signal may be used. For example, instead of a single bit '1' and '0' type ping signal, a 3 bit signal modulation could be used. With a 3 bit ping signal the uplink pattern would be able to provide 8 different characters or symbols (e.g. not just the '1', '0', and 'X' in the above example). Such 3-bit signaling would be capable of providing more accurate speed detection. However, the 3 bits would require spending more bits on the ping signal. Therefore even though a more accurate system would be achieved, it may also take longer to implement at the stylus.

In embodiments, the signal modulation used is a DSSS signal modulation. This type of signal modulation allows for large quantities of information to be sent quickly with relatively low complexity. This allows for faster processing and thus a faster determination of stylus speed. It should be appreciated that other signal modulation formats may be used to achieve the objective of determining the stylus speed based on a spatially varying pattern of signals at a digitizer and a detected sequence of those signals at the stylus. That is any signal which varies from one antenna to the next could be used.

The use of a different signal modulation to those described above may require the hardware described above to be altered to accommodate this signal modulation. An example of such a modified version of the presently described method is described herein below.

It should be understood that the above described method for determining the speed of a stylus at the stylus can be implemented with any spatially repeating pattern. For example any pattern of signals able to be output by the antenna of a digitizer would enable the above described techniques to be implemented.

In an alternative embodiment, the spatial pattern may not be provided by interfering ping signals at junctions, but by individual antennas instead of junctions. I.e. In another alternative or additional variation, the antenna grid of the digitizer need not necessarily take the form of a grid of crisscrossing or intersecting antennas. In another example the grid could comprise an individual antenna at each uplink "pixel" position. In this embodiment the spatial pattern could be provided by simply providing a specific signal to each antenna. In some possible implementations the signal output at each antenna in this embodiment may even be unique across the whole digitizer grid. Such an arrangement would allow each sequence to also provide information on the direction of motion of the stylus. It should be appreciated that this embodiment would likely require a dedicated set of antennas, and not the use of a pre-existing grid of antennas as in the above described embodiment. The individual antenna embodiment would also require providing a large number of different signals to each of the antennas such that they could be told apart more distinctly. However, implementing a large but repeating set of uplink signals would be enough to enable the likely direction of motion of the stylus to be determined with a high enough probability to provide useful information.

In the above description, numerous specific details are set forth to provide a more thorough understanding of the described embodiments. However, it will be apparent to one of skill in the art that the described embodiments may be practiced without one or more of these specific details. In other instances, well-known features have not been described in order to avoid obscuring the described embodiments.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Generally, any of the functions described herein can be implemented using software, firmware, hardware (e.g., fixed logic circuitry), or a combination of these implementations. The modules and steps shown separately in FIG. 2 may or may not be implemented as separate modules or steps. The terms "module," "functionality," and "component" as used herein generally represent software, firmware, hardware, or a combination thereof. In the case of a software implementation, the module, or functionality represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

It will be appreciated that the above embodiments have been described by way of example only.

Although the above description refers to a stylus with a sensor tip, it should be understood that the pointing device need not be limited to a stylus. Other devices for use with a digitizer may also have their speed determined in the above described way, and may comprise a sensor which is not necessarily a sensor tip. For example, the device may be a glove worn on a hand comprising circuitry for interacting with a digitizer. As another example the device may be a ring type device worn around a finger of a hand and comprising circuitry for interacting with a digitizer. As yet another example, the device may be a sleeve or cap type device for wearing on one or more fingers of a hand and comprising circuitry for interacting with a digitizer. All of the above example devices may also be configured to provide haptic feedback in response to determining the speed of the movement of the device on a digitizer.

More generally, according to one aspect disclosed herein, there is provided a device for use with a touch surface digitizer, the device comprising: a sensor configured to receive uplink signals emitted by a grid of antennas in the digitizer; and a controller configured to detect the uplink signals via the sensor; wherein the controller is further configured to determine a speed of the device based on a detected sequence of the uplink signals as received at the sensor from one or more junctions of the antenna grid relative to a predetermined spatial pattern of the uplink signals as emitted across the grid.

In embodiments, the sequence comprises detected states of the uplink signal. The possible states may be either a strong positive signal or '1' (two constructively interfering positive signals), a strong negative signal or '0' (two constructively interfering negative signals), or no signal 'X' where a positive and negative signal have destructively interfered with each other.

In embodiments, the sequence of uplink signals is a sequence of interfering ping signals.

In embodiments, the device may be a stylus and the sensor may be a sensor tip of the stylus.

In embodiments, the device may be a stylus, a glove, a ring, a cap, or a sleeve device, etc.

In embodiments, the controller is configured to match the detected sequence of uplink signals to one of a plurality of predetermined sequences stored in a local memory of the device, where each predetermined sequence corresponds to a predetermined speed of the device.

In embodiments, the controller is configured to calculate a speed of the device by deriving a distance moved by the device and a time over which that distance was moved by the device using the detected pattern of uplink signals.

In embodiments, the controller is configured to derive the distance moved by the device based on the duration of instances of different uplink signals being received from different junctions of the antenna grid and the known distance between the junctions transmitting said different uplink signals.

In embodiments, the grid of antennas comprises a plurality of rows and columns of antenna, alternate antennas across the rows emitting a ping signal and an inverse of the ping signal alternately, and alternate antennas across the columns emitting a ping signal and an inverse of the ping signal alternately; each of said detected uplink signals is emitted at a junction of a different respective combination of antennas of one of the rows and one of the columns; and the respective uplink signal is formed by the pings and/or inverse pings constructively or destructively interfering with each other.

In embodiments, in response to determining the speed of the device, the controller is configured to activate a device component to provide a level of haptic feedback corresponding to the determined speed.

According to a second aspect disclosed herein, there is provided a touch surface digitizer for use with an electronic device, the digitizer comprising: a grid of antennas configured to emit an uplink signal from each of a plurality of junctions; a signal generator module for generating the ping signal; and electronic circuitry arranged to connect each antenna in the grid to the signal generator to provide the plurality of uplink signals, wherein the digitizer is configured such that the uplink signal is detected as different at any two neighbouring junctions of the grid by the device.

In embodiments, the uplink signal detected by the device comprises two interfering ping and/or inverse ping signals.

In embodiments, the circuitry comprises a NOT gate positioned at alternate antennas of the grid along both row and column directions.

In embodiments, the uplink signal is a spatially varying signal with a predetermined pattern across the junctions of the grid.

In embodiments, the ping signal has a duration of 31 microseconds, and is transmitted once in every 15 millisecond digitizer uplink signal transmission cycle.

In embodiments, the parallel antenna of the grid have a minimum spacing of 4 mm.

According to a third aspect disclosed herein, there is provided a computer system comprising: the device of any of claims 1 to 5; and the touch surface digitizer of any of claims 6 to 11.

According to a fourth aspect disclosed herein, there is provided a method of determining the velocity of a device on a touch surface digitizer, the method comprising: transmitting an uplink signal during each digitizer transmission cycle from a plurality of points on the digitizer in a predetermined spatial pattern; detecting a sequence of the uplink signals at the device over at least two digitizer transmission cycles from at least two of said points; and determining a speed of the device based on the sequence of detected uplink signals combined with information on said spatial pattern.

In embodiments, the method comprises calculating the speed of the device by deriving a distance moved by the device and a time over which that distance was moved based on the duration of instances of different uplink signals being received from different junctions of the antenna grid and the known distance between the junctions transmitting said different uplink signals.

According to a fifth aspect disclosed herein, there is provided a computer program product comprising code embodied on computer-readable storage and configured so as when run on one or more processing units of the computer system of claim 12 to perform the method of claim 13 or 14.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The inventio claimed is:

1. A device for use with a touch surface digitizer, the device comprising:
a sensor configured to receive uplink signals emitted by a grid of antennas in the digitizer; and
a controller configured to detect the uplink signals via the sensor, the controller being configured to determine a speed of the device based on a detected sequence of the uplink signals as received at the sensor from a junction of the grid of antennas,
wherein the controller is configured to determine the speed of the device by matching the detected sequence of uplink signals to a sequence stored in a local memory of the device, where the sequence stored in the local memory of the device corresponds to the speed of the device.

2. The device of claim 1, wherein the controller is configured to calculate the speed of the device by deriving a distance moved by the device and a time over which that distance was moved by the device using the detected sequence of uplink signals.

3. The device of claim 1, wherein the controller is configured to derive a distance moved by the device based on a duration of instances of different uplink signals being received from different junctions of the grid and a known distance between the junctions transmitting the different uplink signals.

4. The device of claim 1, wherein:
the grid of antennas comprises rows and columns of antenna, alternate antennas across the rows emitting a ping signal and an inverse of the ping signal alternately, and alternate antennas across the columns emitting a ping signal and an inverse of the ping signal alternately;

each of the detected uplink signals is emitted at a junction of a different respective combination of antennas of one of the rows and one of the columns; and each of the detected uplink signals is formed by the ping signals or inverse ping signals or both, constructively or destructively interfering with each other.

5. The device of claim 1, wherein in response to determining the speed of the device, the controller is configured to provide a level of haptic feedback corresponding to the determined speed.

6. The device of claim 1, wherein the uplink signals comprise at least one of ping signals or inverse ping signals that at least one of constructively or destructively interfere with each other.

7. The device of claim 1, wherein the uplink signals comprises two interfering ping or inverse ping signals or both.

8. The device of claim 1, wherein the uplink signals comprise a 3-bit signal.

9. The device of claim 1, wherein the uplink signals comprise a direct sequence spread spectrum (DSSS) signal modulation.

10. The device of claim 1, wherein the device comprises at least one of: a stylus; a glove; a ring; a sleeve; a cap; or an indicator for writing, pointing, or indicating a position on the touch surface digitizer.

11. A device for use with a touch surface digitizer, the device comprising:

a local memory;

a sensor configured to receive uplink signals emitted by a grid of antennas in the digitizer; and a controller configured to detect the uplink signals via the sensor, the controller being configured to determine a speed of the device based on a detected sequence of the uplink signals as received at the sensor from a junction of the grid of antennas, wherein the controller is configured to determine the speed of the device by matching the detected sequence of uplink signals to one of a plurality of sequences stored in the local memory that correspond to calculated speeds of the device.

12. The device of claim 11, wherein the controller is configured to calculate the speed of the device by deriving a distance moved by the device and a time over which that distance was moved by the device using the detected sequence of uplink signals.

13. The device of claim 11, wherein:

the grid of antennas comprises rows and columns of antenna, alternate antennas across the rows emitting a ping signal and an inverse of the ping signal alternately, and alternate antennas across the columns emitting a ping signal and an inverse of the ping signal alternately;

each of the detected uplink signals is emitted at a junction of a different respective combination of antennas of one of the rows and one of the columns; and each of the detected uplink signals is formed by the ping signals or inverse ping signals or both, constructively or destructively interfering with each other.

14. The device of claim 11, wherein in response to determining the speed of the device, the controller is configured to provide a level of haptic feedback corresponding to the determined speed.

15. The device of claim 11, wherein the uplink signals comprise at least one of ping signals or inverse ping signals that at least one of constructively or destructively interfere with each other.

16. The device of claim 11, wherein the uplink signals comprises two interfering ping or inverse ping signals or both.

17. The device of claim 11, wherein the device comprises at least one of: a stylus; a glove; a ring; a sleeve; a cap; or an indicator for writing, pointing, or indicating a position on the touch surface digitizer.

18. The device of claim 11, wherein the uplink signals comprise a 3-bit signal.

19. The device of claim 11, wherein the uplink signals comprise a direct sequence spread spectrum (DSSS) signal modulation.

20. A method comprising:

receiving, at a device, uplink signals emitted by a grid of antennas in a touch surface digitizer;

detecting a sequence of the uplink signals from a junction of the grid of antennas of the touch surface digitizer; and determining a speed of the device by matching the detected sequence of uplink signals to a sequence stored in a local memory of the device that corresponds to the speed of the device.

* * * * *